(12) United States Patent
Gaffo

(10) Patent No.: US 11,517,849 B2
(45) Date of Patent: Dec. 6, 2022

(54) METHOD FOR CONTROLLING GAS GENERATION

(71) Applicant: MICROPROGEL S.R.L., Torreglia (IT)

(72) Inventor: Valter Gaffo, Torreglia (IT)

(73) Assignee: MICROPROGEL S.R.L., Torreglia (IT)

( * ) Notice: Subject to any disclaimer, the term of this patent is extended or adjusted under 35 U.S.C. 154(b) by 0 days.

(21) Appl. No.: 17/251,822

(22) PCT Filed: Jun. 9, 2019

(86) PCT No.: PCT/IB2019/054794
§ 371 (c)(1),
(2) Date: Dec. 14, 2020

(87) PCT Pub. No.: WO2019/243946
PCT Pub. Date: Dec. 26, 2019

(65) Prior Publication Data
US 2021/0252452 A1   Aug. 19, 2021

(30) Foreign Application Priority Data

Jun. 18, 2018 (IT) ................... IT102018000006416

(51) Int. Cl.
*B01D 53/22* (2006.01)
*B01D 53/30* (2006.01)

(52) U.S. Cl.
CPC ............ *B01D 53/22* (2013.01); *B01D 53/30* (2013.01); *B01D 2053/221* (2013.01)

(58) Field of Classification Search
None
See application file for complete search history.

(56) References Cited

U.S. PATENT DOCUMENTS 5,281,253 A * 1/1994 Thompson ........... B01D 53/226
                                                          95/22
5,425,801 A * 6/1995 Prasad ................... B01D 53/22
                                                          95/15

(Continued)

FOREIGN PATENT DOCUMENTS

EP        1324815 A1     7/2003
WO    WO 02/26359 A1 *  4/2002  ............ B01D 53/22

OTHER PUBLICATIONS

English language machine translation for WO 02/26359 A1> retrieved from translationportal.epo.org on Jan. 12, 2022. (Year: 2022).*

*Primary Examiner* — Jason M Greene
(74) *Attorney, Agent, or Firm* — Mark M. Friedman

(57) ABSTRACT

A method is disclosed for controlling the generation of gas occurring in a generator via a filtering membrane (M). The filtering membrane (M) is fed at the entry with a gas pushed by a compressor (C), and is capable of separating gaseous components of the gas at the exit. The method has the steps of detecting the gas pressure at a detection point (SP1) at the membrane entry and/or at the exit (M); adjusting the regime of the compressor (C) so that the detected pressure is maintained at a reference pressure, here called Pref]. Advantages: less wear out for the compressor and extended life cycle.

17 Claims, 2 Drawing Sheets

(56) References Cited

U.S. PATENT DOCUMENTS

Figure 1:
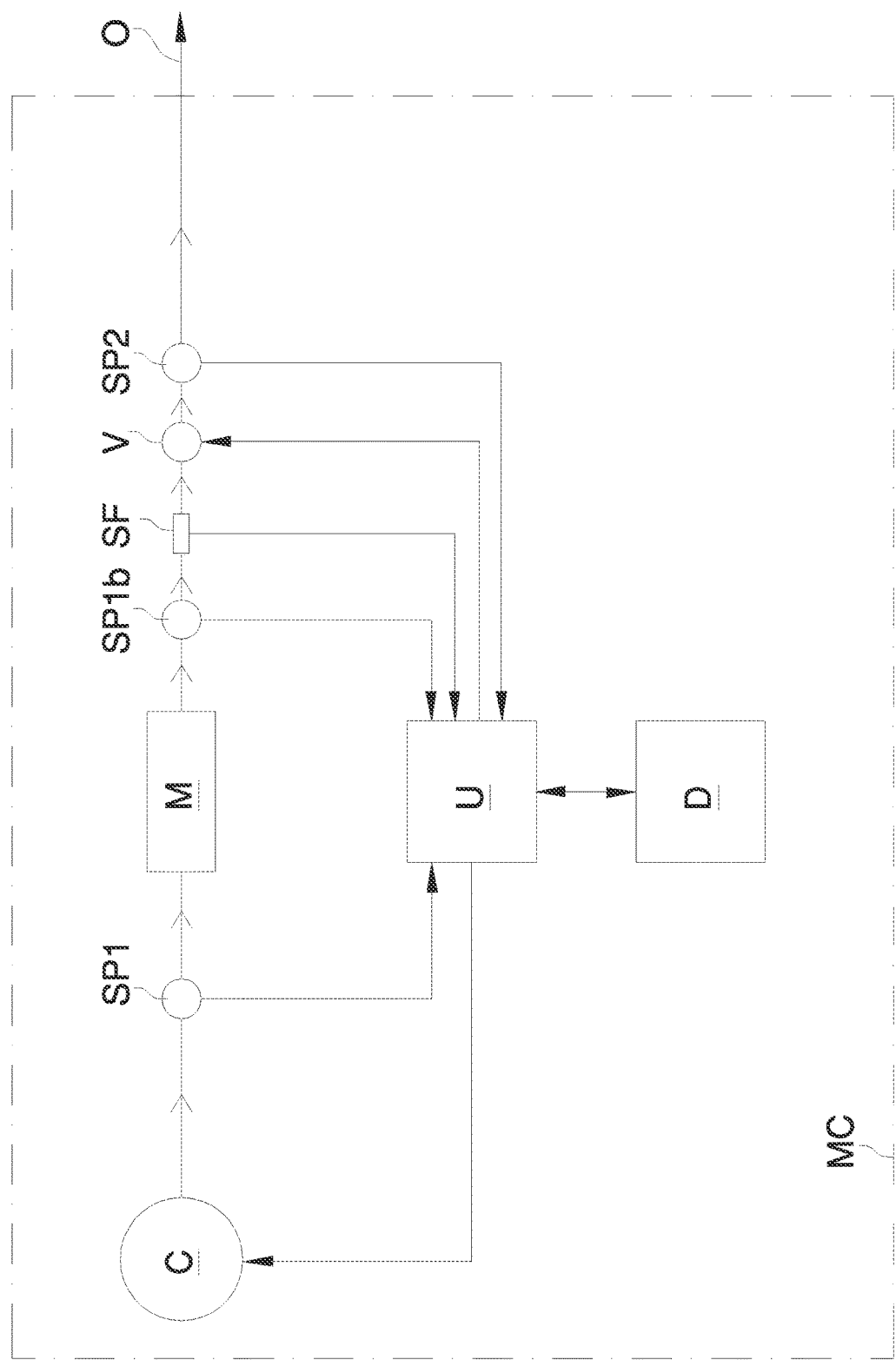

| | | | | |
|---|---|---|---|---|
| 5,840,098 A * | 11/1998 | Barbe | ............... | B01D 53/22 95/18 |
| 2013/0153498 A1 * | 6/2013 | Kiuchi | ............... | B01D 61/368 210/640 |
| 2014/0157985 A1 * | 6/2014 | Scovazzo | ............... | B01D 53/22 95/52 |
| 2015/0047502 A1 * | 2/2015 | Heirman | ............... | B01D 53/22 95/22 |

* cited by examiner

METHOD FOR CONTROLLING GAS GENERATION

The invention relates to a method for controlling gas generation occurring through a filtering membrane adapted to separate gaseous components present in a gas.

The invention also refers to a gas generator comprising a filtering membrane adapted to separate gaseous components of a gas.

Gas generators are known equipped with a filtering membrane adapted to selectively separate gaseous components. By inserting a gas at the inlet of the membrane, at the exit a gas is found to which gaseous components have been removed. Therefore in the gas at the exit, if the membrane eliminates properly the unwanted components, only a desired gaseous component remains.

These generators are normally powered by a piston compressor controlled with ON/OFF logic. Because of this, the output pressure from the compressor section has a wide ripple, i.e. a sequence of very high peaks compared to troughs. The membrane downstream the compressor, however, works indeed on the minimum pressure delivered by the compressor, therefore the pressure ripple wastes energy and creates mechanical stresses on the compressor that significantly shorten its working life. Furthermore, membranes begin to have acceptable efficiency only beyond a certain input gas flow rate, which forces to operate the compressor above a certain speed. Once again this constraint translates into a high working regimen for the compressor, therefrom the aforementioned disadvantages.

Overcoming one or more of these problems is the object of the invention, which is defined in the appended claims, in which the dependent ones define advantageous variants.

One aspect of the invention is a method to control the generation of gas occurring by means of a filtering membrane, the filtering membrane being
fed at the entry with a gas pushed by a compressor, and
capable of separating gaseous components of the gas at the exit, and
with the steps of detecting the gas pressure at a detection point at the inlet and/or at the exit of the membrane;
adjusting the compressor regimen so that the detected pressure is maintained at a reference pressure, here called Pref1.

In particular, the aforementioned adjustment is an electronic feedback control.

Since the pressure at the entry and/or exit of the membrane remains constant or approximately constant, the optimal working point can be chosen for the membrane and, consequently, especially for the compressor, which, working at a lower pressure, consumes and wears less, wasting also less energy and producing less heat.

The working point of the compressor is regulated continuously, by checking e.g. electronically the revolutions of an engine of its, in particular through a power inverter, i.e. without intermittent operation (during the above-mentioned pressure regulation the compressor remains always on).

As a preferred variant, the gas pressure is detected at the exit of the membrane downstream of said detection point and the gas pressure is regulated downstream of said detection point at a pressure value Pref2 that is lower than Pref1, e.g. by controlling a valve inserted in the path of the gas.

In this way the pressure of the gas passing through the membrane can be greater than that required at the generator exit, with the advantage of being able to check the purity of the gas exiting the membrane and supplied by the generator regardless of the working pressure of the membrane. The aforementioned purity is proportional to the gas pressure at the entry of the membrane or to the membrane working pressure.

As a preferred variant, there is the step of calculating or adjusting the value Pref1 to determine a degree of purity of the gas exiting the membrane, and calculating or adjusting the value Pref2 to obtain a desired gas pressure supplied by the generator.

This allows the user of the generator to adjust in the output gas the degree of gas purity and the gas pressure.

In particular, the Pref1 value is calculated or adjusted simultaneously with the step of calculating or adjusting the value Pref2. This makes the two controls independent and available to the user. Note that the setting of the pressure references Pref1 and Pref2, although independent, maintains the advantages of minimum stress and consumption for the compressor.

As a preferred step, the gas flow rate at the exit of the membrane is measured and depending on the measured flow rate the gas pressure is regulated at the entry to the membrane and/or the compressor regimen is regulated. This allows to maximize the efficiency of the membrane, which has zero efficiency at low flow rates (at low flow rates the filtered output gas is practically absent). The target is to set a pressure value at the entry of the membrane that guarantees a certain efficiency.

As preferred step, the membrane is supplied with a gas flow rate higher than that required at the generator exit and excess gas is accumulated in a tank. The advantage is to make the membrane work at a regimen of greater efficiency, when the nominal regimen, corresponding to the supply required at the exit of the generator, is too inefficient. The larger flow rate processed by the membrane is divided into the nominal flow rate value to be sent to the generator exit and into the excess to be stored in the tank.

Another aspect of the invention concerns
a gas generator comprising
a filtering membrane capable of separating at its exit gaseous components of a gas at its entry,
a compressor to feed the filtering membrane's entry with a gas flow,
a (first) pressure sensor to detect the gas pressure at a detection point at the entry and/or exit of the membrane,
an electronic, e.g. microprocessor-based, circuit connected to the (first) sensor and the compressor for adjusting the compressor regimen so that the pressure detected by the sensor is maintained at a reference pressure, here called Pref1.

In particular, the electronic circuit performs the aforementioned adjustment via an electronic feedback control.

The aforementioned generator is advantageously adapted to perform the method.

Preferably the compressor comprises a motor and a power inverter, through which said electronic circuit can control the regimen of the compressor.

As preferred variant, the generator comprises
a second gas pressure sensor at the exit of the membrane, placed downstream of said first pressure sensor and connected to the electronic circuit, and
a pressure regulator element located downstream of said second pressure sensor and connected with the electronic circuit.

The electronic circuit is configured to monitor the second sensor and drive the regulator element so that the gas pressure downstream of said second sensor is maintained at a pressure value Pref2 which is lower than Pref1.

E.g. the pressure regulator element comprises or consists of a valve inserted into the gas path.

As preferred variant, the electronic circuit is configured to calculate or adjust the value Pref1 to determine a purity level of the gas at the exit of the membrane, and calculate or adjust the value Pref2 to get a desired gas pressure delivered by the generator.

In particular, the electronic circuit is configured to calculate or adjust the value Pref1 at the same time as the calculation or adjustment of the value Pref2.

As a preferred variant, the generator comprises a gas flow rate meter at the exit of the membrane and the electronic circuit is configured for adjusting, depending on the measured flow rate, the gas pressure at the entry of the membrane and/or the compressor regimen.

As a preferred variant, the generator comprises a tank for accumulating a gas excess at the exit of the membrane. The electronic circuit is preferably configured to supply the membrane with a gas flow rate greater than what is required at the generator exit, in order to generate an excess of gas to be stored in the tank.

The aforementioned advantages are generally obtained for a compressor of any kind. For optimum efficiency, preferably the compressor is a spiral compressor (scroll compressor), i.e. a compressor that comprises two spiral-shaped fins placed one inside the other, of which one is fixed and one has planetary movement without rotation, so as to compress the gas. Due to their reciprocal movement the two spirals trap and pump or compress pockets of fluid that form thanks to the relative movement.

The compressor may also be a piston compressor.

Preferably the compressor is electronically controlled by an electronic inverter.

The filtering membrane is preferably constituted by a pack of parallel tubes along which the incoming gas is bound to flow.

The method and the generator are particularly advantageous for the production of nitrogen ($N_2$) or oxygen ($O_2$) by filtering ambient air with the membrane.

Figure 2:
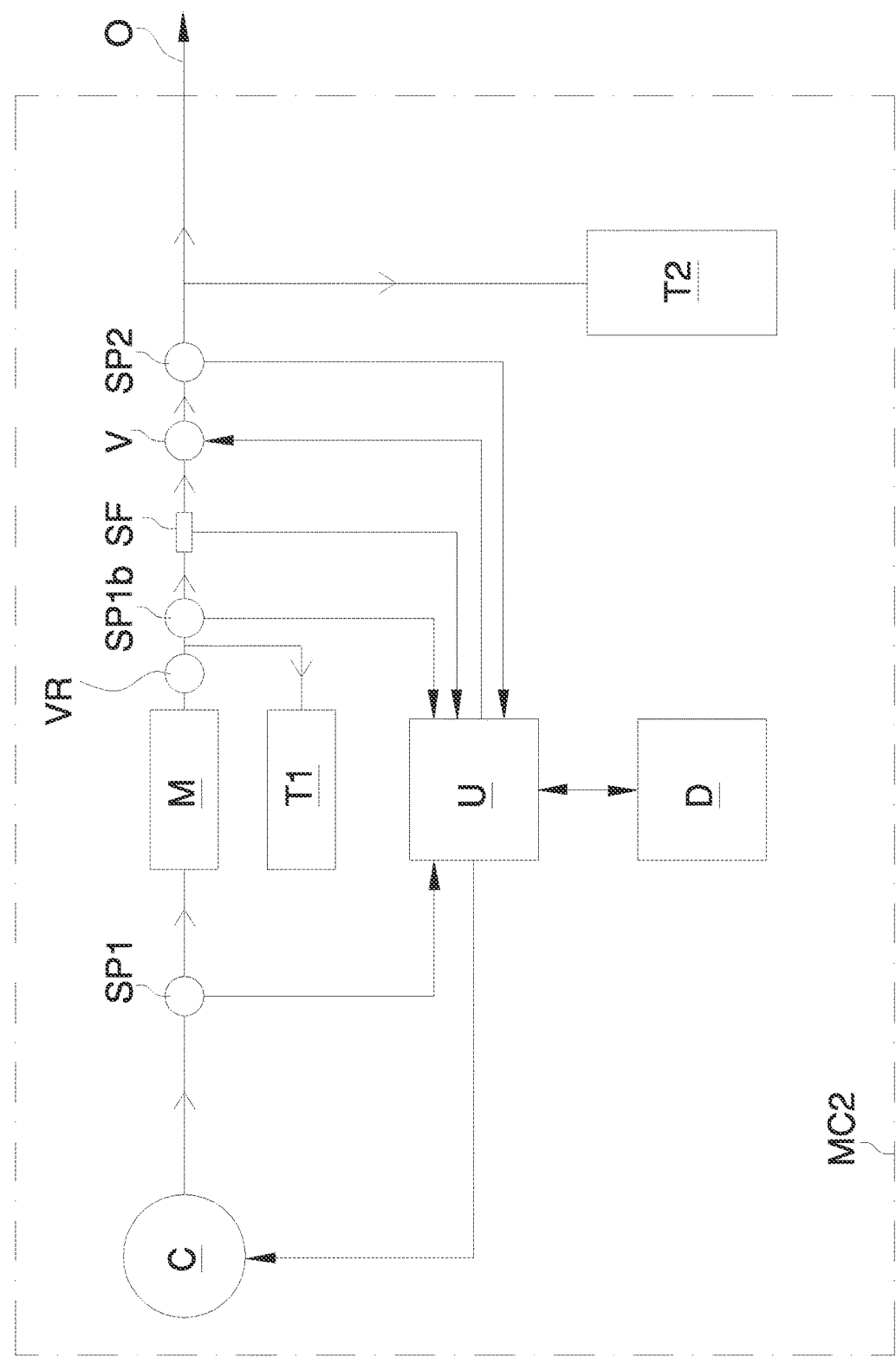

The advantages of the invention will be clearer from the following description of a preferred embodiment of a gas generator, with reference to the attached drawing in which FIG. 1 shows a diagram of a gas generator apparatus, FIG. 2 shows a variation of the scheme for the gas generator apparatus.

In the figures equal numbers indicate equal parts, and in order not to crowd the drawings some parts are not marked by numbers.

An apparatus MC for generating at its exit O nitrogen gas (N2) from atmospheric air is shown in FIG. 1.

The apparatus MC comprises a filtering membrane M which is fed at the entry with ambient air pushed by a compressor C. The open arrows indicate a gas flow.

The membrane M separates at the exit the gaseous nitrogen from the other gaseous components, which get dispersed into the environment.

A pressure sensor—respectively SP1. SP1*b*—is arranged at the entry and/or exit of the membrane M to detect the gas pressure at the entry and/or exit of membrane M.

Downstream of the sensor SP1*b* there is
an (optional) flow sensor SF, to detect the gas flow rate exiting from membrane M, and
followed by a valve V, e.g. a proportional valve.

Downstream of the proportional valve V there is a pressure sensor SP2 to detect the pressure of the gas delivered at the exit O.

The sensors SP1, SP1*b*, SP2, SF, and the V valve are mounted in series on the duct that carries the filtered gas from the membrane exit M to the exit O.

An electronic control unit U is connected to the sensors SP1, SP1*b*, SP2, SF to read the measured values thereof, and is connected to the valve V and to the compressor C for controlling their functioning. Signal lines are indicated by solid arrows whose direction indicates the direction of the signals.

Preferably the electronic control unit U is also connected to a user interface D, such as a display and/or a touch-screen. With the user interface D the operator can program the electronic control unit U to set the flow rate (pressure) of the gas exiting the generator MC and the purity of the generated gas.

According to a preferred variant, the electronic control unit U detects the value of the pressure detected by the sensors SP1 and/or SP1*b*, and regulates the regimen of the compressor C so as to keep such value at a reference value (called Pref1).

In this way the pressure Pref1 with which the membrane M is supplied is constant or almost constant, and coincides with the working pressure of the compressor.

Given that Pref1 is the minimum value (without ripple) between those which guarantee the functioning of the membrane M at a certain pressure, the compressor C works at an optimal regimen, that is, the one that causes it to wear out less remaining the working pressure on the membrane M the same.

According to a second preferred variant, alternative or combinable with the first variant, the electronic control unit U detects the pressure value detected by the sensor SP2 and adjusts the valve V to maintain such detected value at a reference value, called Pref2, which is lower than Pref1.

In this way, the pressure Pref2 at which the gas is delivered at the exit of the generator MC is constant or almost constant.

By combining the two variants an advantageous and more sophisticated control can be implemented, by setting different values for Pref1 and Pref2, .i.e. Pref1>Pref2.

Through the value Pref1 one can adjust the purity of the gas coming out from the membrane M, because such purity depends approximately proportionally on the working pressure of membrane M. Through the value Pref2 one can adjust the gas pressure exiting the apparatus MC. It is Pref1>Pref2 because this is the condition for raising the purity of the gas generated at the exit O while keeping the set value Pref2 the same.

Further, for any desired purity value at the exit O, the compressor C works at the minimum regimen which guarantees such purity, with the advantages said before of longevity and lower consumption.

Preferably the regulation of the control unit U occurs by means of a feedback control.

The flow sensor SF allows an advantageous variant of operation.

The control unit U is programmed
to detect, by means of the sensor SF, the gas flow rate at the exit of the membrane M and, depending on the measured flow rate,
to adjust the gas pressure Pref1 at the entry and/or exit of the membrane M by adjusting the regimen of compressor C (in this way, the efficiency of membrane M, which has zero efficiency at low flow rates, is maximized. Instead, a pressure value can be set at the entry of the membrane M that guarantees a certain efficiency), and/or turn off the compressor C if the detected flow is zero or almost zero, not to waste energy.

The apparatus MC2 shows, in relation to the apparatus MC, some more components, to be used alone or in any combination.

There is a non-return valve VR at the exit of membrane M, to avoid backflow or back pressure.

There is an optional tank T1 downstream of the valve VR, useful for nitrogen accumulation when the required output flow is lower than a certain threshold that would cause the membrane—and consequently the whole generator—to work at low energy efficiency. In this case, the control unit U is programmed to control the compressor C in order to increase the pressure inside the membrane M, e.g. with predefined thresholds, to accumulate the gas into the tank T1. while the proportional valve V is controlled by the control unit U to maintain constant pressure at exit O. Once a sufficient quantity of gas is accumulated in the tank T1, the control unit U turns off the compressor C and turns it on again once the pressure in the tank T1 falls below a threshold (for this purpose the control unit U for example monitors a pressure sensor that measures the pressure inside the tank T1).

There is an optional tank T2 in parallel with the exit O, which is used for storing an excess of filtered gas when, to maximize efficiency, the membrane M works at a flow rate greater than what is delivered at the exit O. When the tank T2 is full the control unit U e.g. is programmed to switch off the compressor C, to save energy, until the tank T2, delivering gas to the exit O, is empty or no longer has sufficient pressure.

Preferably the control unit U comprises a programmed microprocessor to perform the described functions. The control unit U can also be built only with discrete components to carry out the operating logic.

The invention claimed is:

1. A method for controlling the generation of nitrogen or oxygen occurring in a generator by filtering a gas via a filtering membrane, the filtering membrane having an entry and an exit, the filtering membrane being fed at the entry with the gas pushed by a compressor running with a regimen and being capable of separating gaseous components of the gas at the exit, the gas being ambient air, the method comprising the steps of:
    detecting the gas pressure at a detection point (SP1) at the entry of the filtering membrane and/or at the exit of the filtering membrane; and
    adjusting the regimen of the compressor so that the detected pressure is maintained at a reference pressure, wherein the gas pressure is also detected at the exit of the filtering membrane downstream of the detection point and the gas pressure is regulated downstream of the detection point at a pressure value which is smaller than the reference pressure.

2. The method according to claim 1, wherein the filtering membrane consists of a pack of parallel tubes along which the gas at the entry of the filtering membrane is made to flow.

3. The method according to claim 1, wherein a value of the reference pressure is calculated or adjusted to determine a degree of purity of the gas exiting the filtering membrane, and the pressure value is calculated or adjusted to obtain a desired pressure of the gas delivered by the generator.

4. The method according to claim 1, wherein the gas flow-rate is measured at the exit of the filtering membrane and, depending on the measured flow-rate, the pressure of the gas entering the filtering membrane or the regiment of the compressor is adjusted.

5. The method according to claim 1, wherein the filtering membrane is fed with a gas flow-rate higher than required at an exit of the generator and a gas excess is accumulated in a tank.

6. A gas generator comprising:
    a filtering membrane having an entry and an exit, the filtering membrane capable of separating at the exit gaseous components of a gas at the entry, the gas being ambient air and the components of the gas being nitrogen or oxygen;
    a compressor running with a regimen and operative to feed the entry of the filtering membrane with a gas flow;
    a first pressure sensor for detecting the gas pressure at a detection point at the entry and/or the exit of the filtering membrane;
    an electronic circuit connected to the first sensor and to the compressor to regulate the regimen of the compressor so that the pressure detected by the first sensor is maintained at a reference pressure;
    a second sensor of gas pressure at the exit of the filtering membrane, located downstream of the first pressure sensor and connected to the electronic circuit; and
    a pressure regulator element located downstream of the second pressure sensor and connected to the electronic circuit,
    the electronic circuit being configured to monitor the second sensor and to drive the regulator element so that the pressure of the gas downstream of the second sensor is maintained at a pressure value which is lower than reference pressure.

7. The gas generator according to claim 6, wherein the compressor comprises:
    a motor, and
    a power inverter, through which the electronic circuit can control the regimen of the compressor.

8. The gas generator according to claim 6, further comprising: a tank for accumulating an excess of gas at the exit of the filtering membrane, and the electronic circuit is configured to supply the filtering membrane with a gas flow-rate greater than that required by an exit of the generator so as to generate an excess of gas to be stored in the tank.

9. The method according to claim 3, wherein the gas flow-rate is measured at the exit of the filtering membrane and, depending on the measured flow-rate, the pressure of the gas entering the filtering membrane or the regimen of the compressor is adjusted.

10. The method according to claim 1, wherein the gas pressure is regulated downstream of the detection point at a pressure value that is lower than the reference pressure by controlling a valve inserted in the path of the gas.

11. The method according to claim 3, wherein the gas pressure is regulated downstream of the detection point at a pressure value that is lower than the reference pressure by controlling a valve inserted in the path of the gas.

12. The method according to claim 4, wherein the gas pressure is regulated downstream of the detection point at a pressure value that is lower than the reference pressure by controlling a valve inserted in the path of the gas.

13. The method according to claim 9, wherein the gas pressure is regulated downstream of the detection point at a pressure value that is lower than the reference pressure by controlling a valve inserted in the path of the gas.

14. The gas generator according to claim 6, wherein the compressor is a scroll compressor.

15. The gas generator according to claim 6, wherein the pressure regulator element comprises or consists of a valve inserted into the gas path.

16. The gas generator according to claim 6, wherein the electronic circuit is configured to calculate or adjust the reference pressure to determine a purity level of the gas at the exit of the filtering membrane, and calculate or adjust the pressure value to get a desired gas pressure delivered by the generator.

17. The gas generator according to claim 6, further comprising a gas flow rate meter at the exit of the filtering membrane and the electronic circuit is configured for adjusting, depending on the measured flow rate, the regimen of the compressor and/or the gas pressure at the entry of the filtering membrane.

* * * * *